United States Patent
Enzmann et al.

(10) Patent No.: US 9,622,031 B2
(45) Date of Patent: *Apr. 11, 2017

(54) SYSTEM AND METHOD FOR PERMISSION TO ACCESS MOBILE LOCATION INFORMATION

(71) Applicant: AT&T Intellectual Property I, L.P., Atlanta, GA (US)

(72) Inventors: Mark J. Enzmann, Roswell, GA (US); Robert T. Moton, Jr., Alpharetta, GA (US); Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,499

(22) Filed: Jul. 6, 2015

(65) Prior Publication Data

US 2015/0312714 A1 Oct. 29, 2015

Related U.S. Application Data

(63) Continuation of application No. 13/936,251, filed on Jul. 8, 2013, now Pat. No. 9,078,094, which is a (Continued)

(51) Int. Cl.
*H04W 24/00* (2009.01)
*H04W 4/02* (2009.01)
(Continued)

(52) U.S. Cl.
CPC ............. *H04W 4/02* (2013.01); *H04L 63/101* (2013.01); *H04W 4/20* (2013.01); *H04W 8/16* (2013.01);
(Continued)

(58) Field of Classification Search
CPC ....... H04W 4/02; H04W 4/021; H04W 4/023; H04W 4/025; H04W 4/04; H04W 12/06; H04W 12/08; H04W 4/20; H04W 8/16
(Continued)

(56) References Cited

U.S. PATENT DOCUMENTS

| 4,445,118 A | 4/1984 | Taylor et al. |
| 4,757,267 A | 7/1988 | Riskin |

(Continued)

FOREIGN PATENT DOCUMENTS

| EP | 000964542 | 12/1999 |
| EP | 0964542 | 12/1999 |

(Continued)

OTHER PUBLICATIONS

BellSouth "The Real Yellow Pages", Greater Atlanta A-L, 2004 BellSouth Advertising & Publishing Corp.
(Continued)

*Primary Examiner* — Jean Gelin
(74) *Attorney, Agent, or Firm* — Hartman & Citrin LLC

(57) ABSTRACT

A location query service is disclosed. The service provides requestors with a location of a device. The service receives a location query from a requestor, retrieves location information associated with the network user, and returns the location information to the requestor. Before returning the location information to the requestor, the service is configured, in some embodiments, to authenticate that the requestor is authorized by the network user to receive the network user's location information. Methods for providing a location query service also are disclosed.

18 Claims, 4 Drawing Sheets

Related U.S. Application Data continuation of application No. 13/289,297, filed on Nov. 4, 2011, now Pat. No. 8,483,724, which is a continuation of application No. 12/909,401, filed on Oct. 21, 2010, now Pat. No. 8,064,930, which is a continuation of application No. 12/580,616, filed on Oct. 16, 2009, now Pat. No. 7,844,284, which is a continuation of application No. 11/589,688, filed on Oct. 30, 2006, now Pat. No. 7,636,575, which is a continuation of application No. 09/739,315, filed on Dec. 19, 2000, now Pat. No. 7,130,630.

(51) Int. Cl.
*H04W 4/20* (2009.01)
*H04W 8/16* (2009.01)
H04L 29/06 (2006.01)
H04W 12/06 (2009.01)
H04W 12/08 (2009.01)

(52) U.S. Cl.
CPC ............ *H04L 63/08* (2013.01); *H04W 12/06* (2013.01); *H04W 12/08* (2013.01)

(58) Field of Classification Search
USPC .... 455/410, 411, 456.1, 456.2, 456.3, 456.4, 455/456.5, 456.6, 404.2, 414.2
See application file for complete search history.

(56) References Cited

U.S. PATENT DOCUMENTS

| | | |
|---|---|---|
| 4,893,335 A | 1/1990 | Fuller et al. |
| 5,127,042 A | 6/1992 | Gillig et al. |
| 5,128,981 A | 7/1992 | Tsukamoto et al. |
| 5,303,393 A | 4/1994 | Noreen et al. |
| 5,321,242 A | 6/1994 | Heath, Jr. |
| 5,375,161 A | 12/1994 | Fuller et al. |
| 5,440,758 A | 8/1995 | Grube et al. |
| 5,444,444 A | 8/1995 | Ross |
| 5,451,757 A | 9/1995 | Heath, Jr. |
| 5,511,111 A | 4/1996 | Serbetcioglu et al. |
| 5,512,908 A | 4/1996 | Herrick |
| 5,528,248 A | 6/1996 | Steiner et al. |
| 5,544,222 A | 8/1996 | Robinson et al. |
| 5,566,235 A | 10/1996 | Hetz |
| 5,588,037 A | 12/1996 | Fuller et al. |
| 5,588,042 A | 12/1996 | Comer |
| 5,596,625 A | 1/1997 | LeBlanc |
| 5,610,970 A | 3/1997 | Fuller et al. |
| 5,610,973 A | 3/1997 | Comer |
| 5,625,364 A | 4/1997 | Herrick et al. |
| 5,657,375 A | 8/1997 | Connolly et al. |
| 5,663,734 A | 9/1997 | Krasner |
| 5,673,299 A | 9/1997 | Fuller et al. |
| 5,694,453 A | 12/1997 | Fuller et al. |
| 5,696,815 A | 12/1997 | Smyk |
| 5,701,301 A | 12/1997 | Weisser, Jr. |
| 5,712,899 A | 1/1998 | Pace, II |
| 5,713,075 A | 1/1998 | Threadgill et al. |
| 5,720,033 A | 2/1998 | Deo |
| 5,727,057 A | 3/1998 | Emery et al. |
| 5,729,537 A | 3/1998 | Billstrom |
| 5,751,760 A | 5/1998 | Fuller et al. |
| 5,771,283 A | 6/1998 | Chang et al. |
| 5,790,953 A | 8/1998 | Wang et al. |
| 5,794,210 A | 8/1998 | Goldhaber et al. |
| 5,812,763 A | 9/1998 | Teng |
| 5,819,155 A | 10/1998 | Worthy et al. |
| 5,825,283 A | 10/1998 | Camhi |
| 5,825,775 A | 10/1998 | Chin et al. |
| 5,835,907 A | 11/1998 | Newman |
| 5,838,774 A | 11/1998 | Weisser, Jr. |
| 5,848,131 A | 12/1998 | Shaffer et al. |
| 5,852,775 A | 12/1998 | Hidary |
| 5,875,401 A | 2/1999 | Rochkind |
| 5,889,953 A | 3/1999 | Thebaut et al. |
| 5,903,636 A | 5/1999 | Malik |
| 5,949,865 A | 9/1999 | Fusinato |
| 5,949,867 A | 9/1999 | Sonnenberg |
| 5,959,577 A | 9/1999 | Fan et al. |
| 5,961,593 A | 10/1999 | Gabber et al. |
| 5,963,866 A | 10/1999 | Palamara et al. |
| 5,968,176 A | 10/1999 | Nessett et al. |
| 6,011,975 A | 1/2000 | Emery et al. |
| 6,021,126 A | 2/2000 | White et al. |
| 6,028,921 A | 2/2000 | Malik et al. |
| 6,047,327 A | 4/2000 | Tso et al. |
| 6,055,637 A | 4/2000 | Hudson et al. |
| 6,060,993 A | 5/2000 | Cohen |
| 6,076,080 A | 6/2000 | Morscheck et al. |
| 6,085,086 A | 7/2000 | La Porta et al. |
| 6,091,956 A | 7/2000 | Hollenberg |
| 6,101,381 A | 8/2000 | Tajima et al. |
| 6,112,186 A | 8/2000 | Bergh et al. |
| 6,119,000 A | 9/2000 | Stephenson et al. |
| 6,122,520 A | 9/2000 | Want et al. |
| 6,133,853 A | 10/2000 | Obradovich et al. |
| 6,138,003 A | 10/2000 | Kingdon et al. |
| 6,138,119 A | 10/2000 | Hall et al. |
| 6,157,829 A | 12/2000 | Grube et al. |
| 6,182,226 B1 | 1/2001 | Reid et al. |
| 6,183,003 B1 | 2/2001 | Matsuhashi et al. |
| 6,184,829 B1 | 2/2001 | Stilp |
| 6,185,426 B1 | 2/2001 | Alperovich et al. |
| 6,208,854 B1 | 3/2001 | Roberts et al. |
| 6,208,857 B1 | 3/2001 | Agre et al. |
| 6,208,866 B1 | 3/2001 | Rouhollahzadeh et al. |
| 6,229,477 B1 | 5/2001 | Chang et al. |
| 6,230,188 B1 | 5/2001 | Marcus |
| 6,233,329 B1 | 5/2001 | Urban et al. |
| 6,243,581 B1 | 6/2001 | Jawanda |
| 6,249,577 B1 | 6/2001 | Baldwin |
| 6,259,405 B1 | 7/2001 | Stewart et al. |
| 6,311,069 B1 | 10/2001 | Havinis et al. |
| 6,317,718 B1 | 11/2001 | Fano |
| 6,321,092 B1 | 11/2001 | Fitch et al. |
| 6,324,349 B2 | 11/2001 | Nakano et al. |
| 6,324,396 B1 | 11/2001 | Vasa et al. |
| 6,332,127 B1 | 12/2001 | Bandera et al. |
| 6,340,935 B1 | 1/2002 | Hall |
| 6,353,664 B1 | 3/2002 | Cannon et al. |
| 6,369,754 B1 | 4/2002 | Levanon |
| 6,374,246 B1 | 4/2002 | Matsuo |
| 6,377,810 B1 * | 4/2002 | Geiger ............... H04L 63/123 342/357.4 |
| 6,381,465 B1 | 4/2002 | Chern et al. |
| 6,385,591 B1 | 5/2002 | Mankoff |
| 6,404,876 B1 | 6/2002 | Smith et al. |
| 6,411,899 B2 | 6/2002 | Dussell et al. |
| 6,414,635 B1 | 7/2002 | Stewart et al. |
| 6,418,308 B1 | 7/2002 | Heinonen et al. |
| 6,421,411 B1 | 7/2002 | Hsieh |
| 6,421,441 B1 | 7/2002 | Dzuban |
| 6,427,073 B1 | 7/2002 | Kortesalmi et al. |
| 6,442,391 B1 | 8/2002 | Johansson et al. |
| 6,442,687 B1 | 8/2002 | Savage |
| 6,449,497 B1 | 9/2002 | Kirbas et al. |
| 6,463,533 B1 | 10/2002 | Calamera et al. |
| 6,466,862 B1 | 10/2002 | DeKock et al. |
| 6,470,378 B1 | 10/2002 | Tracton et al. |
| 6,470,447 B1 | 10/2002 | Lambert et al. |
| 6,473,626 B1 | 10/2002 | Nevoux et al. |
| 6,477,382 B1 | 11/2002 | Mansfield et al. |
| 6,484,148 B1 | 11/2002 | Boyd |
| 6,491,217 B2 | 12/2002 | Catan |
| 6,496,931 B1 | 12/2002 | Rajchel et al. |
| 6,505,046 B1 | 1/2003 | Baker |
| 6,505,048 B1 | 1/2003 | Moles et al. |
| 6,505,049 B1 | 1/2003 | Dorenbosch |
| 6,505,163 B1 | 1/2003 | Zhang et al. |
| 6,516,203 B1 | 2/2003 | Enzmann et al. |
| 6,519,530 B2 | 2/2003 | Crockett et al. |
| 6,522,876 B1 | 2/2003 | Weiland et al. |

(56) References Cited

U.S. PATENT DOCUMENTS

| | | |
|---|---|---|
| 6,526,275 B1 | 2/2003 | Calvert |
| 6,526,506 B1 | 2/2003 | Lewis |
| 6,529,159 B1 | 3/2003 | Fan et al. |
| 6,545,596 B1 | 4/2003 | Moon |
| 6,546,257 B1 | 4/2003 | Stewart |
| 6,559,769 B2 | 5/2003 | Anthony et al. |
| 6,560,442 B1 | 5/2003 | Yost et al. |
| 6,560,448 B1 | 5/2003 | Baldwin et al. |
| 6,560,461 B1 | 5/2003 | Fomukong et al. |
| 6,574,548 B2 | 6/2003 | DeKock et al. |
| 6,590,885 B1 | 7/2003 | Jorgensen |
| 6,594,482 B1 | 7/2003 | Findikli et al. |
| 6,594,483 B2 | 7/2003 | Nykanen et al. |
| 6,614,781 B1 | 9/2003 | Elliott et al. |
| 6,618,474 B1 | 9/2003 | Reese |
| 6,618,593 B1 | 9/2003 | Drutman et al. |
| 6,622,016 B1 | 9/2003 | Sladek et al. |
| 6,625,457 B1 | 9/2003 | Raith |
| 6,628,928 B1 | 9/2003 | Crosby et al. |
| 6,628,938 B1 | 9/2003 | Rachabathuni et al. |
| 6,640,184 B1 | 10/2003 | Rabe |
| 6,647,257 B2 | 11/2003 | Owensby |
| 6,647,269 B2 | 11/2003 | Hendrey et al. |
| 6,650,901 B1 | 11/2003 | Schuster et al. |
| 6,654,607 B1 | 11/2003 | Shobatake et al. |
| 6,662,014 B1 | 12/2003 | Walsh |
| 6,675,017 B1 | 1/2004 | Zellner et al. |
| 6,677,894 B2 | 1/2004 | Sheynblat et al. |
| 6,678,265 B1 | 1/2004 | Kung et al. |
| 6,701,160 B1 | 3/2004 | Pinder et al. |
| 6,711,474 B1 | 3/2004 | Treyz et al. |
| 6,716,101 B1 | 4/2004 | Meadows et al. |
| 6,725,048 B2 | 4/2004 | Mao et al. |
| 6,732,101 B1 | 5/2004 | Cook |
| 6,738,808 B1 | 5/2004 | Zellner |
| 6,748,217 B1 | 6/2004 | Hunzinger et al. |
| 6,754,482 B1 * | 6/2004 | Torabi ............... H04W 8/18 455/410 |
| 6,754,504 B1 | 6/2004 | Reed |
| 6,779,020 B1 | 8/2004 | Henrick |
| 6,782,259 B2 | 8/2004 | Bamburak et al. |
| 6,799,049 B1 | 9/2004 | Zellner et al. |
| 6,816,720 B2 | 11/2004 | Hussain et al. |
| 6,819,929 B2 | 11/2004 | Antonucci et al. |
| 6,826,414 B1 | 11/2004 | Reynolds et al. |
| 6,829,475 B1 | 12/2004 | Lee et al. |
| 6,834,050 B1 | 12/2004 | Madour et al. |
| 6,834,341 B1 | 12/2004 | Bahl et al. |
| 6,850,758 B1 | 2/2005 | Paul et al. |
| 6,867,733 B2 | 3/2005 | Sandhu et al. |
| 6,868,074 B1 | 3/2005 | Hanson |
| 6,874,011 B1 | 3/2005 | Spielman et al. |
| 6,876,858 B1 | 4/2005 | Duvall et al. |
| 6,879,584 B2 | 4/2005 | Thro et al. |
| 6,882,641 B1 | 4/2005 | Gallick et al. |
| 6,898,433 B1 | 5/2005 | Rajaniemi et al. |
| 6,934,558 B1 | 8/2005 | Sainton et al. |
| 6,937,869 B1 | 8/2005 | Rayburn |
| 6,940,950 B2 | 9/2005 | Dickinson et al. |
| 6,954,147 B1 | 10/2005 | Cromer et al. |
| 6,954,526 B1 | 10/2005 | Glenn et al. |
| 6,954,649 B2 | 10/2005 | Kotzin |
| 6,961,583 B2 | 11/2005 | Moles et al. |
| 6,961,584 B2 | 11/2005 | Leedom, Jr. |
| 6,963,557 B2 | 11/2005 | Knox |
| 6,975,874 B1 | 12/2005 | Bates et al. |
| 6,996,211 B2 | 2/2006 | Reynolds et al. |
| 6,999,779 B1 | 2/2006 | Hashimoto |
| 7,005,985 B1 | 2/2006 | Steeves |
| 7,023,995 B2 | 4/2006 | Olsson |
| 7,039,431 B2 | 5/2006 | Mukherjee |
| 7,043,231 B2 | 5/2006 | Bhatia et al. |
| 7,051,196 B2 | 5/2006 | Angelo et al. |
| 7,069,319 B2 | 6/2006 | Zellner et al. |
| 7,079,627 B2 | 7/2006 | Crago et al. |
| 7,085,555 B2 | 8/2006 | Zellner et al. |
| 7,085,578 B2 | 8/2006 | Barclay et al. |
| 7,093,286 B1 | 8/2006 | King |
| 7,103,368 B2 | 9/2006 | Teshima |
| 7,103,460 B1 | 9/2006 | Breed |
| 7,106,843 B1 | 9/2006 | Gainsboro et al. |
| 7,110,749 B2 | 9/2006 | Zellner et al. |
| 7,116,977 B1 | 10/2006 | Moton et al. |
| 7,123,693 B2 | 10/2006 | Nelson et al. |
| 7,124,101 B1 | 10/2006 | Mikurak |
| 7,181,017 B1 | 2/2007 | Nagel et al. |
| 7,181,225 B1 | 2/2007 | Moton et al. |
| 7,181,529 B2 | 2/2007 | Bhatia et al. |
| 7,190,960 B2 | 3/2007 | Wilson et al. |
| 7,203,502 B2 | 4/2007 | Wilson et al. |
| 7,212,829 B1 | 5/2007 | Lau et al. |
| 7,224,978 B2 | 5/2007 | Zellner et al. |
| 7,224,987 B1 | 5/2007 | Bhela et al. |
| 7,236,799 B2 | 6/2007 | Wilson et al. |
| 7,245,925 B2 | 7/2007 | Zellner |
| 7,260,186 B2 | 8/2007 | Zhu et al. |
| 7,260,378 B2 | 8/2007 | Holland et al. |
| 7,284,232 B1 | 10/2007 | Bates et al. |
| 7,299,034 B2 | 11/2007 | Kates |
| 7,305,350 B1 | 12/2007 | Bruecken |
| 7,330,464 B2 | 2/2008 | Brouwer et al. |
| 7,366,522 B2 | 4/2008 | Thomas |
| 7,383,052 B2 | 6/2008 | Moton, Jr. et al. |
| 7,412,234 B2 | 8/2008 | Zellner |
| 7,418,503 B2 | 8/2008 | Zellner et al. |
| 7,428,411 B2 | 9/2008 | Zellner |
| 7,433,673 B1 | 10/2008 | Everson et al. |
| 7,509,133 B2 | 3/2009 | Zellner et al. |
| 7,529,359 B2 | 5/2009 | Gallant et al. |
| 7,552,467 B2 | 6/2009 | Lindsay |
| 7,593,712 B2 | 9/2009 | Moton et al. |
| 7,603,110 B2 | 10/2009 | Zellner et al. |
| 7,606,938 B2 | 10/2009 | Roese et al. |
| 7,636,575 B2 | 12/2009 | Enzmann et al. |
| 7,664,488 B2 | 2/2010 | Zellner et al. |
| 7,664,509 B2 | 2/2010 | Zellner et al. |
| 7,668,537 B2 | 2/2010 | De Vries |
| 7,680,590 B2 | 3/2010 | Sanqunetti |
| 7,685,629 B1 | 3/2010 | White et al. |
| 7,796,998 B1 | 9/2010 | Zellner et al. |
| 7,873,369 B2 | 1/2011 | Zellner et al. |
| 7,894,801 B2 | 2/2011 | Zellner et al. |
| 7,941,130 B2 | 5/2011 | Moton et al. |
| 7,966,026 B2 | 6/2011 | Zellner et al. |
| 8,010,126 B2 | 8/2011 | Moton et al. |
| 8,041,817 B2 | 10/2011 | Zellner et al. |
| 8,086,224 B2 | 12/2011 | Zellner et al. |
| 8,165,568 B2 | 4/2012 | Zellner et al. |
| 8,185,130 B2 | 5/2012 | Zellner et al. |
| 8,494,501 B2 | 7/2013 | Zellner et al. |
| 8,755,777 B2 | 6/2014 | Zellner et al. |
| 2001/0034709 A1 | 10/2001 | Stoifo et al. |
| 2002/0035605 A1 | 3/2002 | McDowell et al. |
| 2002/0035699 A1 | 3/2002 | Crosbie |
| 2002/0037709 A1 | 3/2002 | Bhatia et al. |
| 2002/0037722 A1 | 3/2002 | Hussain et al. |
| 2002/0037731 A1 | 3/2002 | Mao et al. |
| 2002/0037744 A1 | 3/2002 | Bhatia et al. |
| 2002/0037750 A1 | 3/2002 | Hussain et al. |
| 2002/0038362 A1 | 3/2002 | Bhatia et al. |
| 2002/0038386 A1 | 3/2002 | Bhatia et al. |
| 2002/0052781 A1 | 5/2002 | Aufricht et al. |
| 2002/0070879 A1 | 6/2002 | Gazit et al. |
| 2002/0077083 A1 | 6/2002 | Zellner et al. |
| 2002/0077084 A1 | 6/2002 | Zellner et al. |
| 2002/0077118 A1 | 6/2002 | Zellner et al. |
| 2002/0077897 A1 | 6/2002 | Zellner et al. |
| 2002/0077987 A1 | 6/2002 | Hasegawa et al. |
| 2002/0090932 A1 | 7/2002 | Bhatia et al. |
| 2002/0095312 A1 | 7/2002 | Wheat |
| 2002/0102993 A1 | 8/2002 | Hendrey et al. |
| 2002/0107027 A1 | 8/2002 | O'Neil |
| 2002/0173317 A1 | 11/2002 | Nykanen et al. |
| 2003/0046405 A1 | 3/2003 | O'Neill et al. |

(56) References Cited

U.S. PATENT DOCUMENTS

| | | |
|---|---|---|
| 2003/0109245 A1 | 6/2003 | McCalmont et al. |
| 2003/0195698 A1 | 10/2003 | Jones |
| 2003/0229592 A1 | 12/2003 | Florance et al. |
| 2004/0097243 A1 | 5/2004 | Zellner et al. |
| 2004/0203900 A1 | 10/2004 | Cedervall et al. |
| 2004/0203903 A1 | 10/2004 | Wilson et al. |
| 2004/0205198 A1 | 10/2004 | Zellner et al. |
| 2005/0272445 A1 | 12/2005 | Zellner et al. |
| 2006/0030335 A1 | 2/2006 | Zellner et al. |
| 2006/0030339 A1 | 2/2006 | Zhovnirovsky et al. |
| 2006/0089134 A1 | 4/2006 | Moton et al. |
| 2006/0094447 A1 | 5/2006 | Zellner et al. |
| 2006/0099966 A1 | 5/2006 | Moton et al. |
| 2006/0105784 A1 | 5/2006 | Zellner et al. |
| 2006/0167986 A1 | 7/2006 | Trzyna et al. |
| 2006/0189327 A1 | 8/2006 | Zellner et al. |
| 2006/0195570 A1 | 8/2006 | Zellner et al. |
| 2007/0010260 A1 | 1/2007 | Zellner |
| 2007/0015495 A1 | 1/2007 | Winter et al. |
| 2007/0027621 A1 | 2/2007 | Operowsky et al. |
| 2007/0042789 A1 | 2/2007 | Moton et al. |
| 2007/0047523 A1 | 3/2007 | Jiang |
| 2007/0063875 A1 | 3/2007 | Hoffberg |
| 2007/0105565 A1 | 5/2007 | Enzmann et al. |
| 2007/0124721 A1 | 5/2007 | Cowing et al. |
| 2007/0136603 A1 | 6/2007 | Kuecuekyan |
| 2007/0142060 A1 | 6/2007 | Moton et al. |
| 2007/0250920 A1 | 10/2007 | Lindsay |
| 2008/0096529 A1 | 4/2008 | Zellner |
| 2008/0132252 A1 | 6/2008 | Altman et al. |
| 2008/0261571 A1 | 10/2008 | Zellner et al. |
| 2008/0261624 A1 | 10/2008 | Moton et al. |
| 2008/0299957 A1 | 12/2008 | Zellner et al. |
| 2009/0047937 A1 | 2/2009 | Zellner et al. |
| 2009/0259588 A1 | 10/2009 | Lindsay |
| 2009/0325551 A1 | 12/2009 | Zellner et al. |
| 2010/0105417 A1 | 4/2010 | Zellner et al. |
| 2010/0131584 A1 | 5/2010 | Johnson |
| 2010/0151815 A1 | 6/2010 | Zellner et al. |
| 2010/0296510 A1 | 11/2010 | Zellner |
| 2011/0143708 A1 | 6/2011 | Zellner et al. |
| 2011/0312341 A1 | 12/2011 | Moton et al. |
| 2012/0034930 A1 | 2/2012 | Zellner et al. |
| 2012/0123869 A1 | 5/2012 | Zellner et al. |
| 2012/0196572 A1 | 8/2012 | Zellner et al. |
| 2012/0264452 A1 | 10/2012 | Zellner et al. |
| 2012/0276873 A1 | 11/2012 | Zellner et al. |
| 2012/0289251 A1 | 11/2012 | Moton et al. |

FOREIGN PATENT DOCUMENTS

| | | |
|---|---|---|
| JP | 1194628 | 8/1989 |
| JP | 3128540 | 5/1991 |
| JP | 7234789 | 9/1995 |
| JP | 7288514 | 10/1995 |
| JP | 7319706 | 12/1995 |
| JP | 8044568 | 2/1996 |
| JP | 8087296 | 4/1996 |
| WO | 9819484 | 5/1998 |
| WO | WO 98/19484 | 5/1998 |
| WO | 9927716 | 6/1999 |
| WO | WO 99/27716 | 6/1999 |

OTHER PUBLICATIONS

BellSouth "The Real Yellow Pages", Greater Atlanta M-Z, 2004 BellSouth Advertising & Publishing Corp.

Petronis, Scott, "Mapping Technology: The Common Thread," Wireless Review, vol. 17, No. 3, pp. 10-14, Feb. 1, 2000, ISSN: 1099-9248.

Microsoft Mobility Developer Conference 2003.

3rd Generation Partnership Project: Technical Specification Group Services and System Aspects; Functional Stage 2 Description of Location Services in UMTS (1999).

"Open Wave Announces Availability to End-to-End Set of Location Services for Wireless Internet," http://www.openwave.com/us/news_room/press_releases/2001/20010320, 2001.

"Wireless Application Protocol", WAP Forum, Oct. 1999, Wireless Internet Today, pp. 1-20.

Mark Moeglein, et al., "An Introduction to Snap Track Server-Aided GPS Technology," available at http://www.snaptrack.com/atwork.html, Sep. 21, 1998, pp. 333-342.

"Signal Soft Wireless Location Services", available at http://signalsoftcorp.com/products/location_manager.html, Copyright 1999, earliest capture by Wayback Machine Internet Archive on Aug. 29, 1999, no publication date provided.

U.S. Office Action dated Oct. 14, 2014 in U.S. Appl. No. 13/936,251.

U.S. Notice of Allowance dated Feb. 26, 2015 in U.S. Appl. No. 13/936,251.

U.S. Office Action dated Feb. 23, 2012 in U.S. Appl. No. 13/289,297.

U.S. Office Action dated Jun. 13, 2012 in U.S. Appl. No. 13/289,297.

U.S. Office Action dated Nov. 26, 2012 in U.S. Appl. No. 13/289,297.

U.S. Notice of Allowance dated Mar. 14, 2013 in U.S. Appl. No. 13/289,297.

U.S. Office Action dated Mar. 30, 2011 in U.S. Appl. No. 12/909,401.

U.S. Notice of Allowance dated Jul. 15, 2011 in U.S. Appl. No. 12/909,401.

U.S. Office Action dated Mar. 29, 2010 in U.S. Appl. No. 12/580,616.

U.S. Notice of Allowance dated Sep. 16, 2010 in U.S. Appl. No. 12/580,616.

U.S. Office Action dated Sep. 25, 2007 in U.S. Appl. No. 11/589,688.

U.S. Office Action dated Apr. 3, 2008 in U.S. Appl. No. 11/589,688.

U.S. Advisory Action dated Oct. 6, 2008 in U.S. Appl. No. 11/589,688.

U.S. Office Action dated Apr. 29, 2009 in U.S. Appl. No. 11/589,688.

U.S. Office Action dated Oct. 6, 2009 in U.S. Appl. No. 11/589,688.

U.S. Notice of Allowance dated Nov. 5, 2009 in U.S. Appl. No. 11/589,688.

U.S. Office Action dated Jun. 21, 2004 in U.S. Appl. No. 09/739,315.

U.S. Office Action dated Feb. 9, 2005 in U.S. Appl. No. 09/739,315.

U.S. Office Action dated Feb. 3, 2006 in U.S. Appl. No. 09/739,315.

U.S. Notice of Allowance dated Aug. 30, 2006 in U.S. Appl. No. 09/739,315.

U.S. Notice of Allowance dated Sep. 27, 2006 in U.S. Appl. No. 09/739,315.

U.S. Office Action dated Aug. 30, 2005 in U.S. Appl. No. 10/704,775.

U.S. Office Action dated Jan. 9, 2006 in U.S. Appl. No. 10/704,775.

U.S. Office Action dated May 29, 2009 in U.S. Appl. No. 10/704,775.

U.S. Notice of Allowance dated Oct. 16, 2009 in U.S. Appl. No. 10/704,775.

U.S. Office Action dated Jun. 1, 2010 in U.S. Appl. No. 12/648,424.

U.S. Notice of Allowance dated Sep. 21, 2010 in U.S. Appl. No. 12/648,424.

U.S. Office Action dated May 16, 2003 in U.S. Appl. No. 09/740,372.

U.S. Office Action dated Oct. 30, 2003 in U.S. Appl. No. 09/740,372.

U.S. Office Action dated Apr. 15, 2004 in U.S. Appl. No. 09/740,372.

U.S. Office Action dated Nov. 2, 2004 in U.S. Appl. No. 09/740,372.

U.S. Advisory Action dated Feb. 15, 2005 in U.S. Appl. No. 09/740,372.

U.S. Notice of Allowance dated Jun. 24, 2005 in U.S. Appl. No. 09/740,372.

U.S. Office Action dated Dec. 13, 2005 in U.S. Appl. No. 09/740,372.

(56) References Cited

OTHER PUBLICATIONS

U.S. Notice of Allowance dated Jan. 27, 2006 in U.S. Appl. No. 09/740,372.
U.S. Notice of Allowance dated May 15, 2006 in U.S. Appl. No. 09/740,372.
U.S. Office Action dated Mar. 10, 2006 in U.S. Appl. No. 11/252,039.
U.S. Office Action dated Feb. 6, 2007 in U.S. Appl. No. 11/252,039.
U.S. Office Action dated Sep. 13, 2007 in U.S. Appl. No. 11/252,039.
U.S. Office Action dated Mar. 18, 2008 in U.S. Appl. No. 11/252,039.
U.S. Notice of Allowance dated Jun. 15, 2009 in U.S. Appl. No. 11/252,039.
U.S. Office Action dated Jul. 27, 2010 in U.S. Appl. No. 12/552,767.
U.S. Notice of Allowance dated Oct. 10, 2010 in U.S. Appl. No. 12/552,767.
U.S. Office Action dated Jul. 11, 2011 in U.S. Appl. No. 13/031,721.
U.S. Notice of Allowance dated Dec. 23, 2011 in U.S. Appl. No. 13/031,721.
U.S. Office Action dated Jul. 3, 2012 in U.S. Appl. No. 13/437,076.
U.S. Notice of Allowance dated Nov. 28, 2012 in U.S. Appl. No. 13/437,076.
U.S. Notice of Allowance dated Mar. 8, 2013 in U.S. Appl. No. 13/437,076.
U.S. Office Action dated Sep. 5, 2013 in U.S. Appl. No. 13/947,150.
U.S. Notice of Allowance dated Dec. 19, 2013 in U.S. Appl. No. 13/947,150.
U.S. Notice of Allowance dated May 13, 2014 in U.S. Appl. No. 13/947,150.

* cited by examiner

SYSTEM AND METHOD FOR PERMISSION TO ACCESS MOBILE LOCATION INFORMATION

CROSS REFERENCE TO RELATED APPLICATIONS

This is a continuation U.S. application Ser. No. 13/936,251, filed Jul. 8, 2013, now U.S. Pat. No. 9,078,094, which is a continuation of U.S. application Ser. No. 13/289,297, filed Nov. 4, 2011, now U.S. Pat. No. 8,483,724, which is a continuation of Ser. No. 12/909,401, filed Oct. 21, 2010, now U.S. Pat. No. 8,064,930, which is a continuation of U.S. application Ser. No. 12/580,616, filed Oct. 16, 2009, now U.S. Pat. No. 7,844,284, which is a continuation of U.S. application Ser. No. 11/589,688, filed Oct. 30, 2006, now U.S. Pat. No. 7,636,575, which is a continuation of U.S. application Ser. No. 09/739,315, filed Dec. 19, 2000, now U.S. Pat. No. 7,130,630, the entireties of which are herein incorporated by reference.

TECHNICAL FIELD

The present invention relates to the field of wireless networks, and in particular, to wireless networks that track the location of wireless network devices.

BACKGROUND

In compliance with regulations promulgated by the Federal Communications Commission (FCC), wireless networks will soon provide services that are able to determine the location of all network users. These federally mandated services, known as enhanced wireless 911 (E911) services, will require wireless telephones to provide 911 call centers, or Public Safety Answering Points (PSAPs), with vital information necessary to locate and identify a caller in an emergency. To comply with E911 standards, wireless network providers will track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase II requires carriers to provide more precise location information to the PSAP.

Under the FCC rules, wireless networks and the corresponding wireless handheld devices, such as cellular telephones, will provide both the identity and location of the caller to a 911 dispatcher. To provide a caller's identity, the wireless handheld device will furnish a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

Although, in large part, wireless network providers will implement the location tracking systems to comply with the FCC standards, once completed, the providers will have the ability to offer other location-based services supported by the E911 infrastructure. Indeed, beyond the needs of PSAPs in emergency situations, there are many instances in which it is helpful to know the location of a network user. For example, a service dispatcher monitoring the activities of his service technicians may wish to determine the exact locations of his technicians to facilitate efficient scheduling. Although, with conventional mobile telephone networks, the dispatcher could call and ask the technician for his location, the dispatcher may prefer to ascertain the location information without interrupting the technician's activities.

Other location tracking systems provide the ability to determine a person's location without communicating with (or interrupting) the person. However, these solutions require dedicated networks and network devices. For instance, although a global positioning system can provide a person's location without contacting the person, the system requires that the party requesting the location information (referred to herein as the "requestor") have communication hardware that receives the location information from the person's GPS receiver. For example, in a typical fleet vehicle tracking system, the fleet manager must purchase and maintain a central processor that communicates with the GPS receiver in each vehicle.

SUMMARY

The present invention is a location query service for use with a wireless network that tracks the location of network devices. The service provides requestors with the locations of network users, based on the locations of the users' wireless network devices. The service enables a requestor to obtain a network user's location without requiring communication with the user. In addition, the service relieves a requestor of the burden of purchasing and maintaining dedicated location tracking equipment by taking advantage of existing communication infrastructures, such as global computer networks, Public Switched Telephone Networks (PSTNs), and wireless networks (with their soon-to-be-implemented location systems).

According to an exemplary embodiment of the present invention, the location query service receives a location query from a requestor for a network user, retrieves the location information of the network user, and returns the location information to the requestor. Preferably, the requestor is an authorized requestor and the service authenticates that the requestor is authorized before returning the location information to the requestor. Within the query, the requestor provides an identification of the network user, such as a name, telephone number, Internet address, or electronic mail (email) address. The service of the present invention supports a variety of communication methods through which a requestor can submit a location query, for example, voice calls through the Public Switched Telephone Network (PSTN) to an interactive voice response unit (IVRU), personal computer access through a global computer network, and cellular telephone access through a global computer network.

In processing location queries, an exemplary embodiment of the present invention gives the network user control of who can receive his location information. The network user provides the service with a list of authorized requestors who may receive the user's location information. The service authenticates that a requestor is authorized before forwarding location information.

In an alternative exemplary embodiment of the present invention, the location query service prompts a network user each time an unauthorized requestor asks for location information. An unauthorized requestor is a requestor who is not designated on a network user's list of authorized requestors and who has not been pre-approved to receive the user's location information. With these "off-list" requests, the network user permits or denies access for unauthorized (off-list) requestors on an individual basis, while automatically permitting access by authorized (on-list) requestors.

In an exemplary embodiment, the system of the present invention includes a user wireless network and a location server. The user wireless network is in communication with a plurality of network devices-operated by a plurality of network users. The user wireless network is also in communication with a location system for determining the location of each network device. The location server is in communication with the wireless network and with a plurality of requestors. The location server accommodates a variety of interfaces in communicating with the plurality of requestors. For example, for Internet protocol (IP) communication, the location server communicates with the plurality of requestors through a global computer network, e.g., the Internet. As another example, for voice communication, the location server communicates with the plurality of requestors through a PSTN.

According to an exemplary method of the present invention, the location server receives a location query for a network user from a requestor, retrieves the user's location from the location system, and forwards the location back to the requestor. Preferably, the location server also confirms that the requestor is authorized to receive the user's location. In an alternative exemplary embodiment, if the location system provides the location in a "raw" form, not easily understood by the typical requestor (e.g., x-y position coordinates), the method further includes translating the location from the raw form to a "displayable" form (e.g., a street address, building name, or area name). The system component that executes this translation function is a mapping converter. The mapping converter can be provisioned in several locations within the system, from the requestor's device to the devices of the plurality of requestors.

Accordingly, it is an object of the present invention to provide a requestor with the location of a wireless network user.

Another object of the present invention is to provide a wireless network user with the ability to automatically furnish specified requestors with the location of the network user.

Another object of the present invention is to provide a wireless network user with the ability to approve or deny access to the user's location information by a requestor who has not been pre-approved.

These and other objects of the present invention are described in greater detail in the detailed description of the invention, the appended drawings, and the attached claims.

DETAILED DESCRIPTION

The present invention is a location query service for use with a wireless network that tracks the locations of network users. The location query service provides a requestor with the location of a network user. In providing this service, the present invention contemplates future enhanced digital cellular networks, in which network users will use digital cellular handheld devices to access data from a global computer network, and in which digital cellular network providers will track the location of each network user.

Figure 1:
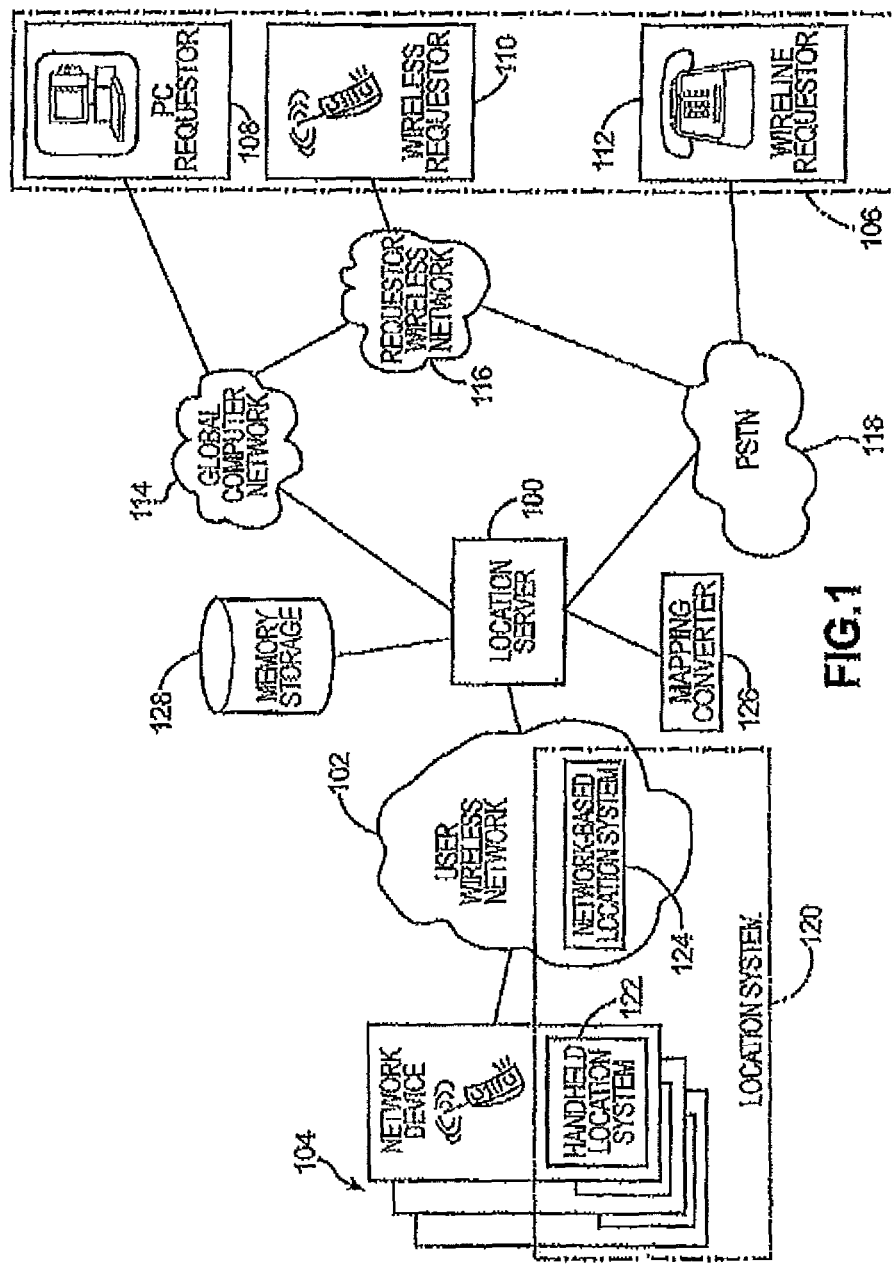
FIG. 1 is a schematic diagram of a system architecture that provides the location query service according to an exemplary embodiment of the present invention.

Referring to FIG. 1, the primary components of an exemplary embodiment of the present invention include a location server 100 and a user wireless network 102. User wireless network 102 is in communication with a plurality of network devices 104. Location server 100 is in communication with user wireless network 102 and with a plurality of requestors 106. The plurality of requestors 106 employ any suitable means to communicate with location server 100, but preferably use at least one of a PC requestor 108, a wireless requestor 110, and a wireline requestor 112. For communication between location server 100 and PC requestor 108, the present invention includes a global computer network 114. For communication between location server 100 and wireless requestor 110 (which has IP messaging capabilities), the present invention includes a requestor wireless network 116 and global computer network 114 for IP messaging, and requestor wireless network 116 and a PSTN 118 for voice communication. For communication between location server 100 and wireline requestor 112, the present invention includes PSTN 118.

According to an exemplary embodiment of the present invention, user wireless network 102 is in communication with a location system 120 that provides the locations of the plurality of network devices 104. Location system 120 includes one or both of handheld location systems 122 and a network-based location system 124. Handheld location systems 122 are provisioned in wireless handheld devices 104. Network-based location systems 124 are part of user wireless network 102.

Location system 120 provides the location information, e.g., position coordinates, of a handheld device, which indicates where a network user is located. Location system 120 can be a part of the wireless network or can be contained in the handheld devices. In an exemplary embodiment of the present invention, as shown in FIG. 1, location system 120 is both a part of the wireless network and is also contained in the handheld devices. For example, suitable methods of determining location as a part of the wireless network include Wireless Access Protocol (WAP) location services, Time Difference of Arrival (TDOA) location systems, Angle of Arrival (AOA) location systems, and other systems using triangulation across cell sites or cell sectors. An example of a suitable location system in the handheld devices is a GPS.

If location system 120 provides location information in raw form, a further exemplary embodiment of the present invention includes a mapping converter 126. An example of information in raw form would be GPS coordinates, with which the typical telephone user is unfamiliar. As used herein, "raw" refers to location information in a rudimentary form, such that a typical telephone user would find it difficult to understand. "Displayable" refers to location information easily understood by a typical network user. Although displayable may imply a visual communication, as used herein, the term extends to other forms of communication, such as audio-based communication. Mapping converter 126 includes a cross-referenced database that allows mapping converter 126 to translate raw location information into displayable location information. For example, the database of mapping converter 126 could include an entry associating coordinates "R-S" (raw information) with the description "101 Park Place" (displayable information).

Although shown as a separate component of the system in FIG. 1, mapping converter 126 could be integral to a component described above. One of ordinary skill in the art would understand that the functions and structure of mapping converter 126 could be located in several different places, anywhere from location system 120 to the communication devices of the requestors 106. For example, mapping converter 126 could be located within network-based location system 124. As another example, mapping converter 126 could also be located within location server 100. Regardless of where mapping converter 126 is provisioned, the desired end result is to deliver displayable location information to the plurality of requestors 106.

Location server 100 executes the service logic of the present invention, including receiving location queries from requestors 106, confirming the access levels of requestors 106, obtaining the location information of wireless network devices 104, and returning the location information to requestors 106. Although shown as a separate component in FIG. 1, one of ordinary skill in the art would appreciate that location server 100 could be a part of another system component, such as user wireless network 102, PSTN 118, or global computer network 114.

In a representative embodiment, location server 100 consists of two components. The first component is a locating mechanism (such as location system 120) that determines locations of network devices 104 using various technologies (e.g., GPS, triangulation, radio signal delay, and cell sector) and combinations thereof. The location mechanism can reside in a network device (e.g., GPS) or within user wireless network 102. The location mechanism produces x-y coordinates that are typically transmitted to the second component of location server 100, which could be in the same box or could be connected via an IP network. The second component of location server 100 integrates the coordinate information into various mapping systems and provides an interface to other applications through various protocols, of which IP is the most common.

In an exemplary embodiment of the present invention, location server 100 is in communication with a memory storage 128. Memory storage 128 is a database or other memory storage device that can record relationships between device identifications (e.g., MINs) and network user identifications. In addition, memory storage contains authorized requestor lists for each device identification. Although FIG. 1 shows memory storage 128 as a separate component of the system accessible to location server 100, memory storage 128 could be contained within location server 100.

Wireless handheld devices 104 operate over user wireless network 102. Familiar examples include pagers and cellular telephones. As a minimum, wireless handheld devices 104 provide network users with wireless communication and cooperate with user wireless network 102 to provide the location of the device. This cooperation may simply involve wireless transmissions to user wireless network 102 that enable network-based location system 124 to ascertain the locations of devices 104. Or, in conjunction with network-based location system 124, wireless handheld devices 104 may include handheld location systems 122, such as GPSs integral to the devices. To facilitate the alternative exemplary embodiment in which a network user responds to off-list requests, wireless handheld devices 104 include messaging capabilities that can communicate a request for access, the identification of the unauthorized requestor, and a response by the network user. For example, such messaging capabilities can be audio-based, text-based, or graphical. Preferably, wireless handheld devices 104 are WAP-compatible thin clients having thin browsers adapted to access global computer network 114 and to communicate with, location server 100.

Global computer network 114 provides communication between TCP/IP requestor devices and location server 100. Preferably, global computer network 114 is the Internet. Also, preferably, network 114 provides a user-friendly interface, e.g., a graphical user interface, through which a requestor can submit a location query. With a graphical user interface (GUI), the requestor device, such as PC requestor 108, is provisioned with software that cooperates with the GUI. Global computer network 114 also preferably supports communication with WAP-compatible wireless devices, such as wireless requestor 110. With these WAP-compatible wireless devices, requestor wireless network 116 provides communication between wireless requestor 110 and global computer network 114.

PSTN 118 provides communication between PSTN devices and location server 100. Along with requestor wireless network 116, PSTN 118 also provides communication: between wireless requestors and location server 100. Location server 100 preferably supports a number of different protocols, at least one of which is IP. PSTN 118 preferably includes a Voice XML (Extensible Markup Language) server, which allows PSTN 118 to interface with location server 100 and provides a common markup language for supporting voice browsing applications. The Voice XML server could include, for example, an IVRU allowing a requestor to use a touch-tone pad to navigate the application.

The plurality of requestors 106 communicate with location server 100 using a device compatible with location server 100 or compatible with an interface between the requestors 106 and location server 100. Global computer network 114 and PSTN 118 are examples of these types of interfaces. Compatible devices include personal computers and IP wireless devices for global computer network 114, and standard wireline telephones for PSTN 118.

Figure 2:
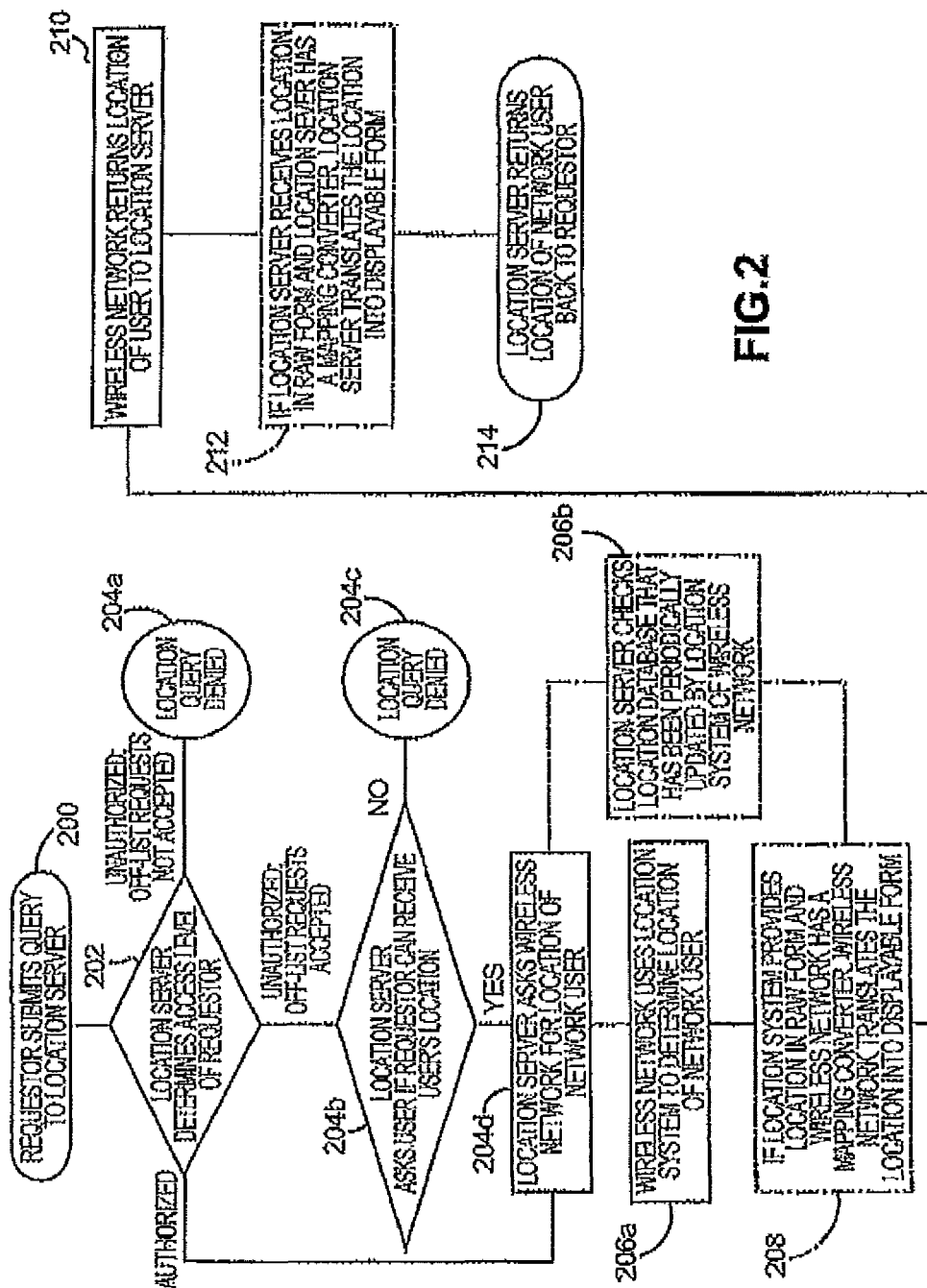
FIG. 2 is a flow chart tracing the steps for providing a location query service according to an exemplary embodiment of the present invention.

Together, the above components provide the location query service as outlined in the flowchart of FIG. 2, according to an exemplary embodiment of the present invention. While the system operation described herein and illustrated in the diagram and flowchart contains many specific details, these specific details should not be construed as limitations on the scope of the invention, but rather as examples of exemplary embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

As shown in step 200, a requestor submits a location query to location server 100. The query includes at least an identification of the requestor and an identification of the network user about whom the requestor desires location information. Optionally, the query also includes a password, which enables a location query service provider to allow access to the service only by requestors who pay for the service. Alternatively, only the network user pays for the service and gives her authorized requestors a password to gain access to the service.

The requestor submits the query using any number of communications media supported by location server 100 and the requestor's individual communication device. For example, if the requestor uses a personal computer 108 linked to location server 100 through global computer network 114, the requestor could initiate the query using a graphical user interface. As another example, if the requestor uses a text messaging wireless device 110 linked to location server 100 through requestor wireless network 116 and global computer network 114, the requestor could initiate the query using a menu driven interface or a series of key sequence inputs. As another example, if the requestor uses a wireline telephone, the requestor could interact with an IVRU using the requestor's touch-tone keys to initiate the query.

In an exemplary embodiment, the present invention accommodates the variety of ways in which a requestor can identify the network user that the requestor wishes to locate. For example, the requestor can give a telephone number, name, Internet address, or email address of the network user. In response, location server 100, global computer network 114, PSTN 118, or a separate system component consults a database cross referencing this information and translates the given identification into an identification of the network user's wireless device (e.g., the MIN). As described later in this process, location server 100 provides location system 120 with this device identification to search for the location of the device.

Once location server 100 has received the query, in step 202, location server 100 determines whether the requestor is an authorized requestor and whether the network user in question accepts requests from unauthorized off-list requestors to view the network user's location information. Location server 100 determines if the requestor is an authorized requestor by consulting memory storage 128, which contains a list that the network user provides. The list indicates which people (requestors) have access to the network user's location information. Although shown as a separate system component in FIG. 1, memory storage 128 could be a part of location server 100, such that the list is stored in location server 100.

Along with the access list, the network user specifies a user preference dictating whether the network user will entertain requests to release her location information to requestors not on the access list. The user preference is also preferably stored in memory storage 128, but can be stored in any location accessible to location server 100. Location server 100 consults this user preference if the requestor is not on the access list.

If the requestor is unauthorized and the network user does not accept individual requests to release location information, in step 204*a*, location server 100 returns a message to the requestor reporting that the location query has been denied.

If the requestor is unauthorized, but the network user does entertain requests to release location information, in step 204*b*, location server 100 asks the network user if the requestor can receive the network user's location information. In asking for approval, location server 100 provides the network user with the identity of the requestor. If the network user chooses not to release her location information to the requestor, in step 204*c*, location server 100 returns a message to the requestor reporting that the location query has been denied.

If, in step 204*b*, the network user chooses to release her location information to the requestor, in step 204*d*, location server 100 proceeds with determining the location information of the wireless device. Likewise, if originally in step 202, location server determines that the requestor is on the access list and is authorized, location server 100 proceeds with determining the location information of the wireless device in step 204*d*.

In step 204*d*, location server 100 asks user wireless network 102 for the location information of the network user. In this inquiry, location server 100 includes the identification of the device corresponding to the network user.

In step 206*a*, user wireless network 102 uses location system 120 to determine the location of the specified network device. User wireless network 102 monitors wireless handheld devices that are powered on. In most instances, a network user simply turns on his wireless handheld device and, if it is a text messaging device, leaves the network interface open, perhaps to a web page. The initial accessing of the web page or the completion of any other wireless transmission (e.g., placing of a wireless telephone call) provides user wireless network 102 with location and identity information. In addition, each time the web page automatically refreshes, or each time the network user enters a browse command, user wireless network 102 receives updated location information. Thus, after location server 100 asks user wireless network 102 for the location of the network user, location system 120 of user wireless network 102 waits for the next transmission by the network device and determines the location information from that transmission. Alternatively, instead of having location server 100 query user wireless network 102 for location information regarding a specific mobile device, location system 120 could be configured to continuously track devices and push location information to location server 100.

Figure 3:
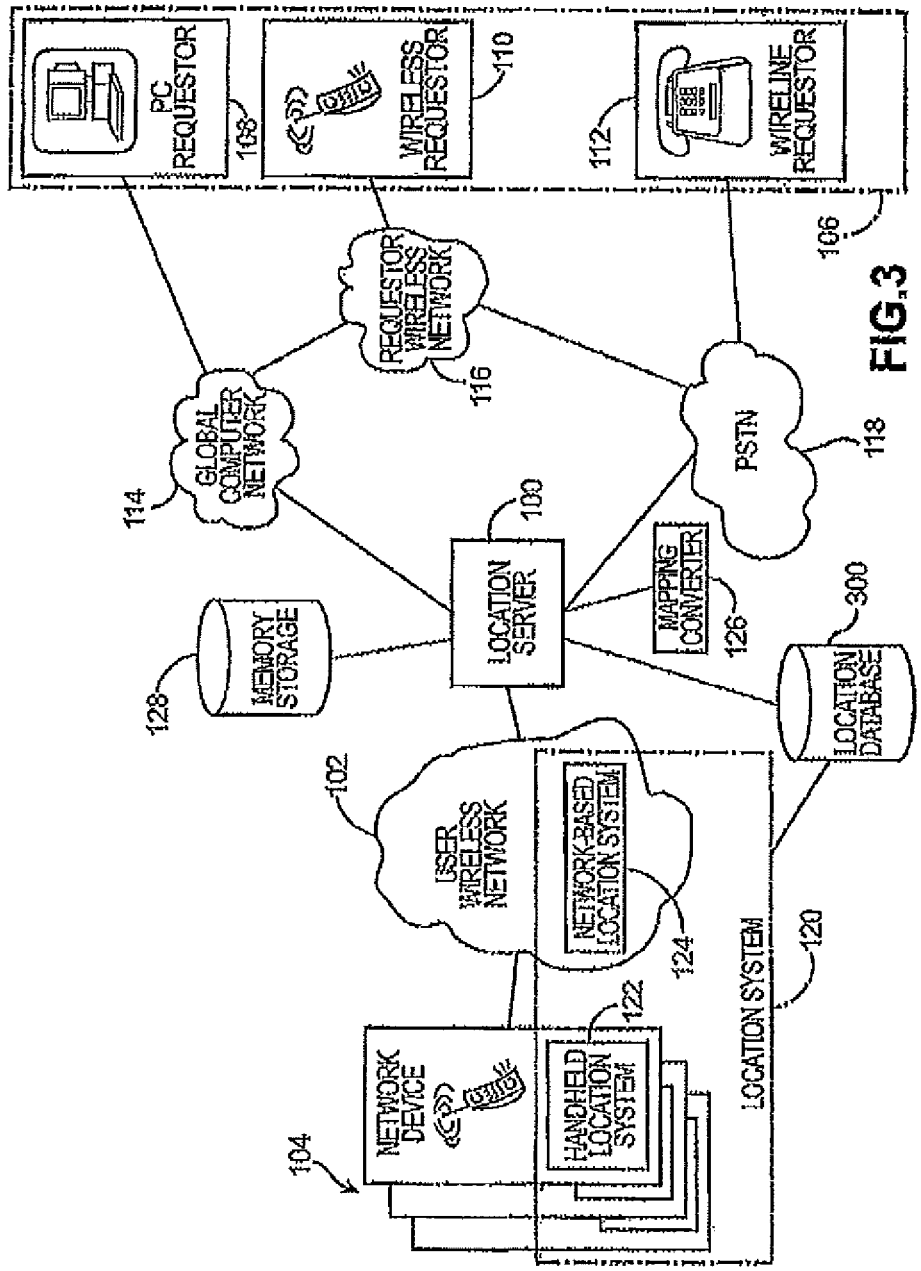
FIG. 3 is a schematic diagram of a system architecture that provides the location query service according to an alternative exemplary embodiment, in which a device's location is periodically recorded in a location database 300.

As another way to avoid a prolonged wait for the transmission providing the location information, in an alternative exemplary embodiment, as shown in FIG. 3, the present invention periodically records a device's location in a location database 300. Therefore, instead of activating location system 120 only in response to a request from location server 100, location system 120 of user wireless network 102 periodically updates location database 300 and always has location information available when location server 100 makes a request. In such a case, as shown in step 206*b*, location server 100 checks location database 300 for the location information of the network user. Although maintaining a database that is periodically updated for all network devices requires considerable amounts of data storage, this alternative embodiment provides a more immediate response to the requestor.

Figure 4:
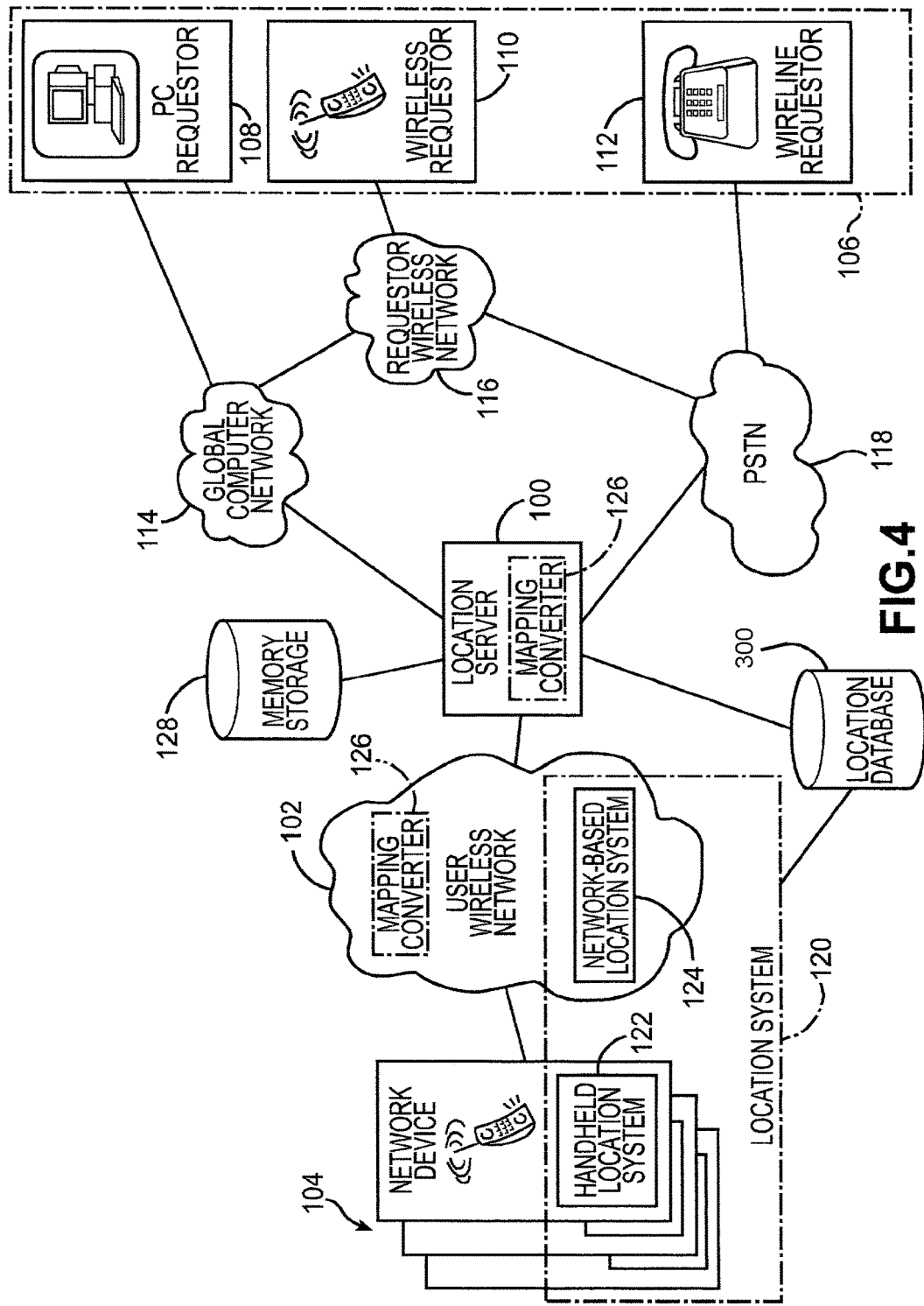
FIG. 4 is a schematic diagram of a system architecture that provides the location query service according to an alternative exemplary embodiment of the present invention, with the mapping converter provisioned in alternative locations.

In steps 206*a* or 206*b*, location system 120 of user wireless network 102 provides the location information in either raw or displayable forms. If location system 120 provides raw location information, such as x-y coordinates, the method of the present invention preferably further includes translating the raw data to a displayable message, easily comprehended by a typical requestor. Mapping converter 126 executes this translation and the method of the present invention varies depending upon where mapping converter 126 is provisioned (as described below and shown in FIG. 4).

In step 208, if location system 120 provides raw location information and mapping converter 126 is provisioned in user wireless network 102, user wireless network 102 translates the raw location information to a displayable form before returning the location information to location server 100. If location system 120 provides the location information in displayable form, or if location system 120 provides the location information in raw form and user wireless network 102 does not have a mapping converter, user wireless network 102 simply forwards the location information.

In step 210, user wireless network 102 returns the location information, whether raw or displayable, to location server 100. In step 212, if the location information is in raw form and location server 100 contains mapping converter 126, location server 100 translates the location information to displayable form. Finally, in step 214, location server 100 returns the location information of the network user back to the requestor.

Specific Examples of Exemplary Embodiments

The benefits of the present invention apply to numerous situations in which a requestor wants to know the location of a network user. The most applicable situations involve network users that require a certain degree of supervision by another (the requestor). Examples of these types of network users include parolees, the elderly, and children. In each case, the present invention provides a location query service by making use of a wireless device that the network user would otherwise already be using for its primary purpose, e.g., a cellular telephone used for personal voice communication.

As another specific example, the present invention could be implemented in the context of an instant messaging service. A user could have an instant messaging service configured to display only the friends of that user who are in the same city as the user. When a friend's name appears on the user's instant messaging screen, the user may want the option to query for the location of the friend to determine, for example, whether the friend is near enough to have lunch and, if so, to select a restaurant that is conveniently located for the friend and the user. Using the present invention to obtain the location information would save the user from having to send a message to the friend asking for the location of the friend. The location query of the present invention could be explicit or implicit, occurring in the background of the instant messaging service, as a result of a configuration option or an action in the application.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed:

1. A system storing logic that, when executed by the system, causes the system to perform operations comprising:
   receiving, a request, the request being for disclosing, to a requestor, location information associated with a mobile device;
   determining, in response to receiving the request, whether the requestor is authorized to receive the location information associated with the mobile device;
   in response to determining that the requestor is unauthorized to receive the location information associated with the mobile device, determining whether a user associated with the mobile device accepts requests for disclosing the location information associated with the mobile device to unauthorized requestors;
   in response to determining that the user associated with the mobile device accepts requests for disclosing the location information associated with the mobile device to unauthorized requestors, determining whether the user of the mobile device will allow the requestor to receive the location information associated with the mobile device; and
   in response to determining that the user of the mobile device will allow the requestor to receive the location information associated with the mobile device, providing the location information associated with the mobile device for disclosure to the requestor.

2. The system of claim 1, wherein determining whether the user associated with the mobile device accepts requests for disclosing the location information associated with the mobile device to unauthorized requestors is based on a preference associated with the mobile device.

3. The system of claim 1, wherein determining whether the requestor is authorized to receive the location information associated with the mobile device comprises verifying whether the requestor is on an authorized user access list associated with the user of the mobile device.

4. The system of claim 1, wherein the location information associated with the mobile device is provided by a location system that is communicatively coupled to the mobile device.

5. The system of claim 1, wherein the location information associated with the mobile device is provided by a location system that is co-located with the mobile device.

6. The system of claim 1, wherein the location information associated with the mobile device is provided by a location system that is co-located with the system.

7. A method comprising:
   receiving, by a system, a request to disclose, to a requestor, location information associated with a mobile device;
   determining, by the system, in response to receiving the request, whether the requestor is authorized to receive the location information associated with the mobile device;
   in response to determining that the requestor is unauthorized to receive the location information associated with the mobile device, determining whether a user associated with the mobile device accepts requests for disclosing the location information associated with the mobile device to unauthorized requestors;
   in response to determining that the user associated with the mobile device accepts requests for disclosing the location information associated with the mobile device to unauthorized requestors, determining, by the system, whether the user of the mobile device will allow the requestor to receive the location information associated with the mobile device; and
   in response to determining that the user of the mobile device will allow the requestor to receive the location information associated with the mobile device, providing, by the system, the location information associated with the mobile device for disclosure to the requestor.

8. The method of claim 7, wherein determining whether the user associated with the mobile device accepts requests for disclosing the location information associated with the mobile device to unauthorized requestors is based on a preference associated the mobile device.

9. The method of claim 7, wherein determining whether the requestor is authorized to receive the location information associated with the mobile device comprises verifying whether the requestor is on an authorized user access list associated with the user of the mobile device.

10. The method of claim 7, wherein providing the location information associated with the mobile device for disclosure to the requestor comprises:
retrieving the location information from a location system communicatively coupled to the mobile device; and
sending the location information to an application for disclosure to the requestor.

11. The method of claim 10, wherein the mobile device includes the location system.

12. The method of claim 10, wherein the location system is located on a server communicatively coupled to the mobile device.

13. A method comprising:
receiving, by a system, a request to disclose, to a requestor, location information associated with a user, wherein the request comprises an identification associated with the user;
determining, by the system, based at least in part on the identification associated with the user, a mobile device associated with the user;
determining, by the system, in response to receiving the request, whether the requestor is authorized to receive the location information;
in response to determining that the requestor is unauthorized to receive the location information, determining, by the system, whether the user associated with the mobile device accepts requests for disclosing the location information to unauthorized requestors;
in response to determining that the user associated with the mobile device accepts requests for disclosing the location information to unauthorized requestors, determining, by the system, whether the user associated with the mobile device will allow the requestor to receive the location information; and
in response to determining that the user associated with the mobile device will allow the requestor to receive the location information associated with the mobile device, providing, by the system, the location information for disclosure to the requestor.

14. The method of claim 13, wherein determining whether the user associated with the mobile device accepts requests for disclosing the location information associated with the mobile device to unauthorized requestors is based on a preference provided by the user associated with the mobile device.

15. The method of claim 13, wherein determining whether the requestor is authorized to receive the location information comprises verifying whether the requestor is on an authorized user access list associated with the user of the mobile device.

16. The method of claim 13, wherein providing the location information for disclosure to the requestor comprises:
retrieving the location information from a location system communicatively coupled to the mobile device; and
sending the location information to an application for disclosure to the requestor.

17. The method of claim 16, wherein the mobile device includes the location system.

18. The method of claim 16, wherein the location system is located on a server communicatively coupled to the mobile device.

* * * * *